Jan. 7, 1941.                L. STEINHAUS                2,227,867
              MEANS FOR GENERATING RAPID MECHANICAL OSCILLATIONS
                    Filed Dec. 27, 1937         2 Sheets-Sheet 1
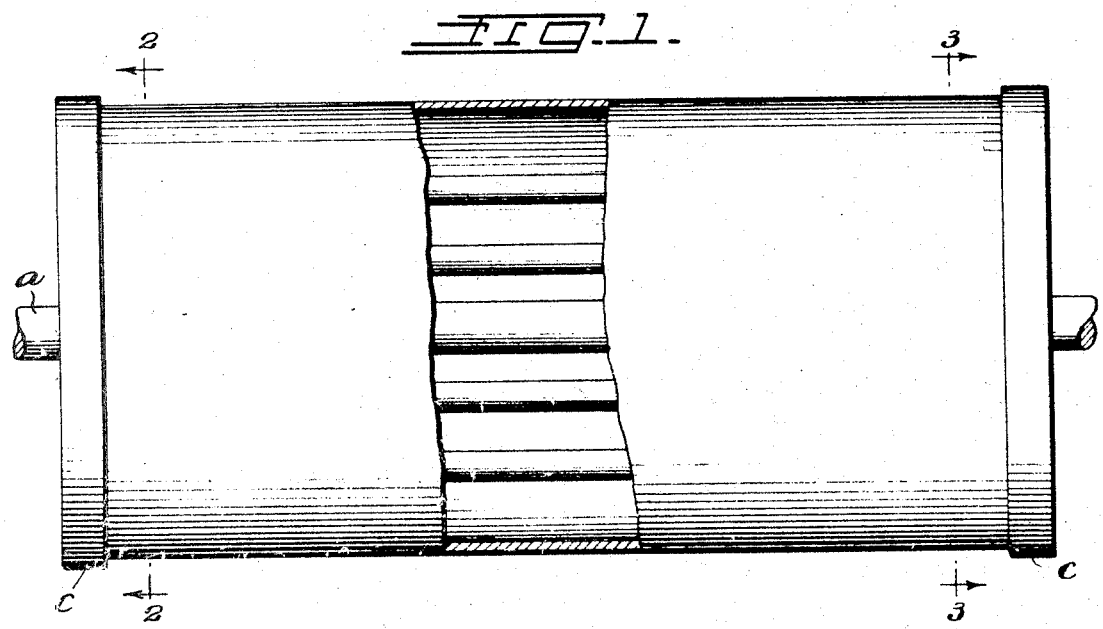
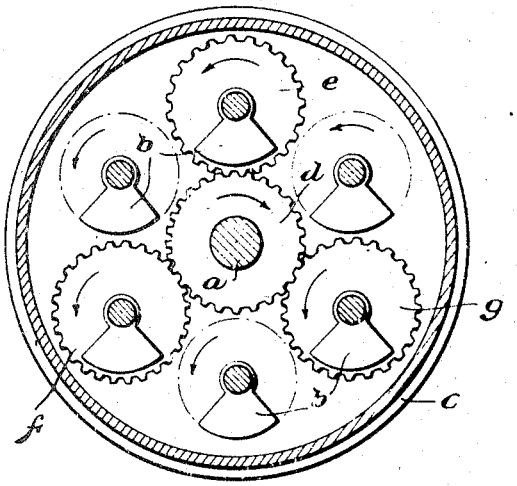 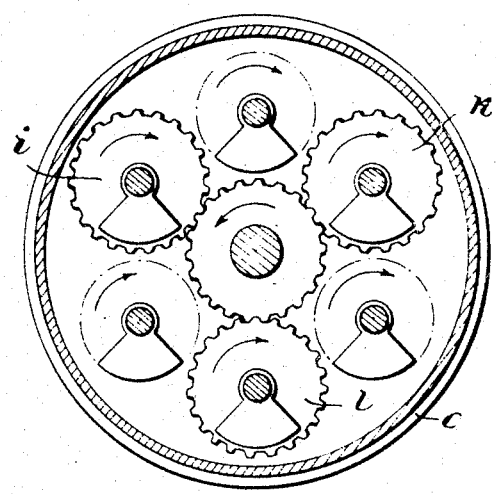
Inventor
Lothar Steinhaus
By E. F. Wenderoth
Atty Jan. 7, 1941.  L. STEINHAUS  2,227,867
MEANS FOR GENERATING RAPID MECHANICAL OSCILLATIONS
Filed Dec. 27, 1937  2 Sheets-Sheet 2
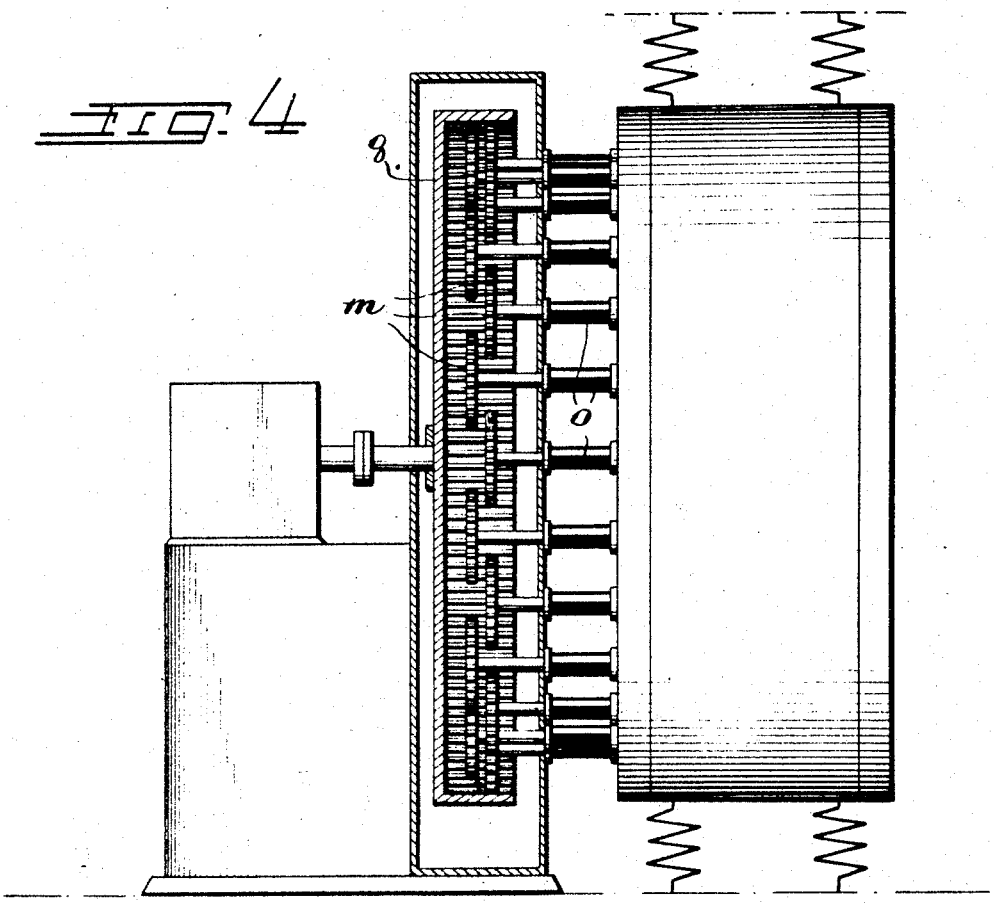
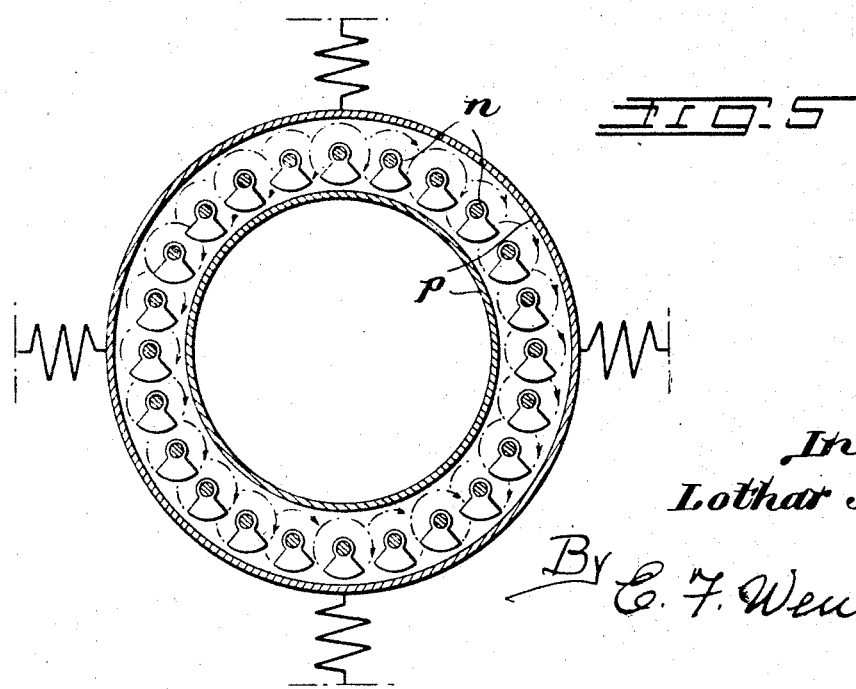
Inventor
Lothar Steinhaus
By E. F. Wenderoth
Atty Patented Jan. 7, 1941

2,227,867

UNITED STATES PATENT OFFICE 2,227,867

MEANS FOR GENERATING RAPID MECHANICAL OSCILLATIONS

Lothar Steinhaus, Berlin-Steglitz, Germany

Application December 27, 1937, Serial No. 181,902
In Germany January 2, 1936

6 Claims. (Cl. 74—61)

This invention relates to means for generating rapid mechanical oscillations.

In order to be able to cause a structure comprising a mass and a spring to oscillate with a frequency above its own natural frequency of oscillation, the generator of the oscillations which may for example be an unbalanced rotating mass, must have a minimum static moment of unbalance (product of the weight of the unbalanced mass and the distance of the centre of gravity of this mass from the centre of rotation), which is sufficiently great to overcome the forces due to damping and inertia. At frequencies far above the natural frequency, the amplitude with which the mass oscillates is found by calculation, neglecting damping, to be approximately equal to the distance of the centre of gravity of the unbalanced mass from the centre of rotation. The static moment of unbalance, the length of the unbalanced shaft and the distance of the centre of gravity of the mass from the centre of rotation determine the dimensions of the generator of the oscillations. The static moment of unbalance divided by $g$ the acceleration due to gravity and multiplied by the square of the angular velocity gives the centrifugal force which is exerted as pressure on the bearings.

When unbalanced shafts which are usually carried in bearings at two places rotate with high peripheral velocities the pressures on the bearings are such that, with the large unbalanced moment necessary for maintaining large masses in oscillation, they cannot be withstood even by roller bearings of the heaviest construction, because the peripheral speeds in the races of the bearings also become higher than is allowable. All attempts which have hitherto been made with a double bearing at each end of the shafts have failed because, owing to the considerable bending of the shaft which occurs even if hollow shafts are employed, it is impossible to distribute the pressure uniformly over the two bearings and, as the bearings heat up after starting, seizing cannot be avoided.

It is possible to distribute the necessary static moment of unbalance over several shafts, in which case the centrifugal forces acting on them must at any time act in the same direction and must rotate with the same velocity, if the natural frequency of oscillation of the energized mass is to be exceeded and the generator itself is not to fracture by fatigue owing to oppositely acting centrifugal forces. The driving members of such shafts must, therefore, be coupled together and driven without slip from one driving means.

The invention relates to a generating device for apparatus, in particular mills, to which large and rapid mechanical oscillations are to be imparted by unbalanced masses which are mounted on parallel shafts disposed around and fixed relatively to a common central shaft. According to the invention, the unbalanced shafts are rotated in the same sense and with the same velocity and the unbalanced masses are fixed in the shafts in the same relative positions, so that the centrifugal forces due to the individual unbalanced masses always act parallel to one another and in the same sense, and a continuously uniform, radial resultant force is transmitted to the mass to be oscillated. Preferably, the unbalanced shafts are rigidly combined with the mass to be oscillated so as to form a unit.

Two forms of generating apparatus in accordance with the invention are illustrated by way of example in the accompanying drawings, in which—

Figure 1 is a diagrammatic view of the first form, and

Figures 2 and 3 are a diagrammatic side and end elevation respectively of the second form.

Referring to the drawings, a central shaft $a$ and a plurality of unbalanced shafts $b$ are journalled in two end annular members $c$. The shafts $b$ are equidistant from the central shaft $a$ and therefore lie in the corners of a regular polygon. The toothed wheel $d$ mounted on the shaft $a$ drives the toothed wheels $e$, $f$, $g$ at the front end of the generator and the unbalanced shafts which are connected to them. The toothed wheel $h$ which is also mounted on the shaft $a$ and is of the same diameter and pitch as the wheel $d$, drives the toothed wheels $i$, $k$, $l$, which are mounted at the back end of the generator and are of the same diameter and pitch as the toothed wheels $e$, $f$, $g$. The shafts to which the wheels $i$, $k$, $l$ are connected are thereby also driven, and the unbalanced masses remain in the same relative positions to one another at all speeds of rotation. The annular members $c$ are rigidly connected together and secure the bearings at the proper distance apart. The rotating resultant of the forces on the bearings is transmitted by the annular members to the mass to be oscillated which is rigidly connected to them, but is not shown in Figure 1.

The arrangement of driving means at the front and the back of the two groups of unbalanced shafts $e$, $f$, $g$ and $i$, $k$, $l$ has the advantage that the arrangement is symmetrical and the driving and driven toothed wheels are of similar form. It is possible to arrange the toothed wheel gearing at one end only of the generator, in which case the toothed wheels $e$, $f$, $g$, $i$, $k$ and $l$ must be considerably smaller than the driving wheel $d$ or one group of toothed wheels $e$, $f$, $g$ and must be displaced axially relatively to the other group $i$, $k$, $l$. The central shaft $a$ can be rotated in the same sense as the unbalanced shaft if toothed chains are employed instead of the toothed wheels $d$ and $h$ which mesh directly with the wheels $e$, $f$, $g$, and $i$, $k$, $l$ and then with an unbalanced mass in accordance with the invention which may be provided on the central shaft $a$. A number of generator units constructed in accordance with Figure 1 can be combined, by coupling their central shafts $a$, to form extended groups of generator units for driving long, oscillatable apparatus.

The toothed wheel driving gear can also be arranged, as shown in Figure 2, separately from the system of energising shafts. In this case, the rotary shafts of the gearing are connected to the unbalanced shafts $n$ of the generator by means of the same number of elastic couplings $o$.

In the form of construction which is illustrated in Figures 2 and 3 the unbalanced shafts are arranged at the periphery of the mass $p$ which is suspended by means of springs. The apparatus is driven only from one side by means of a gearing which consists of an internally toothed wheel $q$ and toothed wheels $m$ which mesh with the wheel $q$ and are all of the same size and provided with the same number of teeth. Each toothed wheel $m$ is connected by an elastic coupling, for example a tube coupling, to one of the unbalanced shafts $n$.

The driven toothed wheels $m$ are staggered relatively to one another so that a compact arrangement is obtained.

If the previously mentioned hollow shafts are used to carry the unbalanced masses in oscillation generators similar to that shown in Figure 1, then it becomes possible, while utilizing the space available to the best advantage, to greatly increase the power generating the oscillations as compared with that produced by the individual shafts or unbalanced shafts or to enable the power to be elevated to a higher degree corresponding to the higher number of oscillations that is to say, the oscillations of the energised mass can be larger and more rapid or if the amplitude and rapidity of the oscillations remains the same, then the energised mass can be constructed to be stronger and larger than was previously possible.

If, instead of the individual shafts of Figure 2, groups of, for example six separate shafts as shown in Figure 1, are employed, and the centre points of the groups lie, as in Figure 1, in the corners of a regular polygon, for example of the twenty-four-sided figure shown in Figure 2, then the power generating the oscillations may be practically unlimited at high speeds of revolution, namely about 1600 to 1700 tons at 1500 revolutions per minute. The estimated power of a generator of this nature is about 1900 to 2000 H. P.

It is also possible to surround the twenty-four-sided figure of this large generator by a further polygon of generator shafts, the corners of which lie on a circle of greater diameter than that on which the corners of the former polygon lie, and thereby at least to double the output of the generator.

I claim:

1. Means for generating rapid mechanical oscillations comprising a plurality of rotatable parallel shafts disposed in parallel relationship in fixed positions with their axes lying in the corners of a regular polygon, unbalance masses fixed in the same relative positions on said parallel shafts, a plurality of further parallel shafts disposed around each of said former shafts, unbalance masses on said shafts in the same relative positions as the former masses and means for rotating all the said parallel shafts in the same sense.

2. Means for generating rapid mechanical oscillations comprising a plurality of rotatable parallel shafts disposed in parallel relationship in fixed positions with their axes lying in the corners of a regular polygon, unbalance masses fixed in the same relative positions on said parallel shafts, a plurality of further shafts disposed in parallel relationship in fixed positions with their axes lying in the corners of a regular polygon which is larger than said former polygon, fixed in the same relative positions thereon, and means for rotating all the said parallel shafts in the same sense.

3. Means for generating rapid mechanical oscillations comprising a central driving shaft, a plurality of rotatable parallel shafts disposed in fixed position around said driving shaft, unbalance masses fixed in the same relative positions on said parallel shafts, toothed wheels on said driving shaft, toothed wheels on said parallel shafts and chains driving the latter toothed wheels from the former.

4. Means for generating rapid mechanical oscillations comprising a central driving shaft, a plurality of rotatable parallel shafts disposed in fixed position around said driving shafts, unbalance masses fixed in the same relative positions on said parallel shafts, toothed wheels on one end of some of said parallel shafts, further toothed wheels on the other ends of the other parallel shafts, and toothed wheels on the ends of the driving shaft from which said former toothed wheels are driven.

5. Means for generating rapid mechanical oscillations comprising a plurality of rotatable shafts disposed in parallel relationship in fixed positions, unbalance masses fixed in the same relative positions on said parallel shafts, a toothed wheel gearing at one end of said parallel shafts, shafts extending from said toothed wheel gearing, flexible couplings connecting the latter shafts with the unbalanced shafts, and means for driving said toothed wheel gearing.

6. Means for generating rapid mechanical oscillations comprising a plurality of rotatable shafts disposed in parallel relationship in fixed positions, unbalance masses fixed in the same relative positions on said parallel shafts, driving means, an internally toothed wheel driven by said means, gear wheels driven by said internally toothed wheel, shafts connected to said gear wheels, and flexible couplings connecting said shafts to said unbalanced shafts.

LOTHAR STEINHAUS.